June 1, 1926.
J. E. BRIDGES
1,586,649
ELECTRICAL MEASURING INSTRUMENT
Filed May 15, 1924
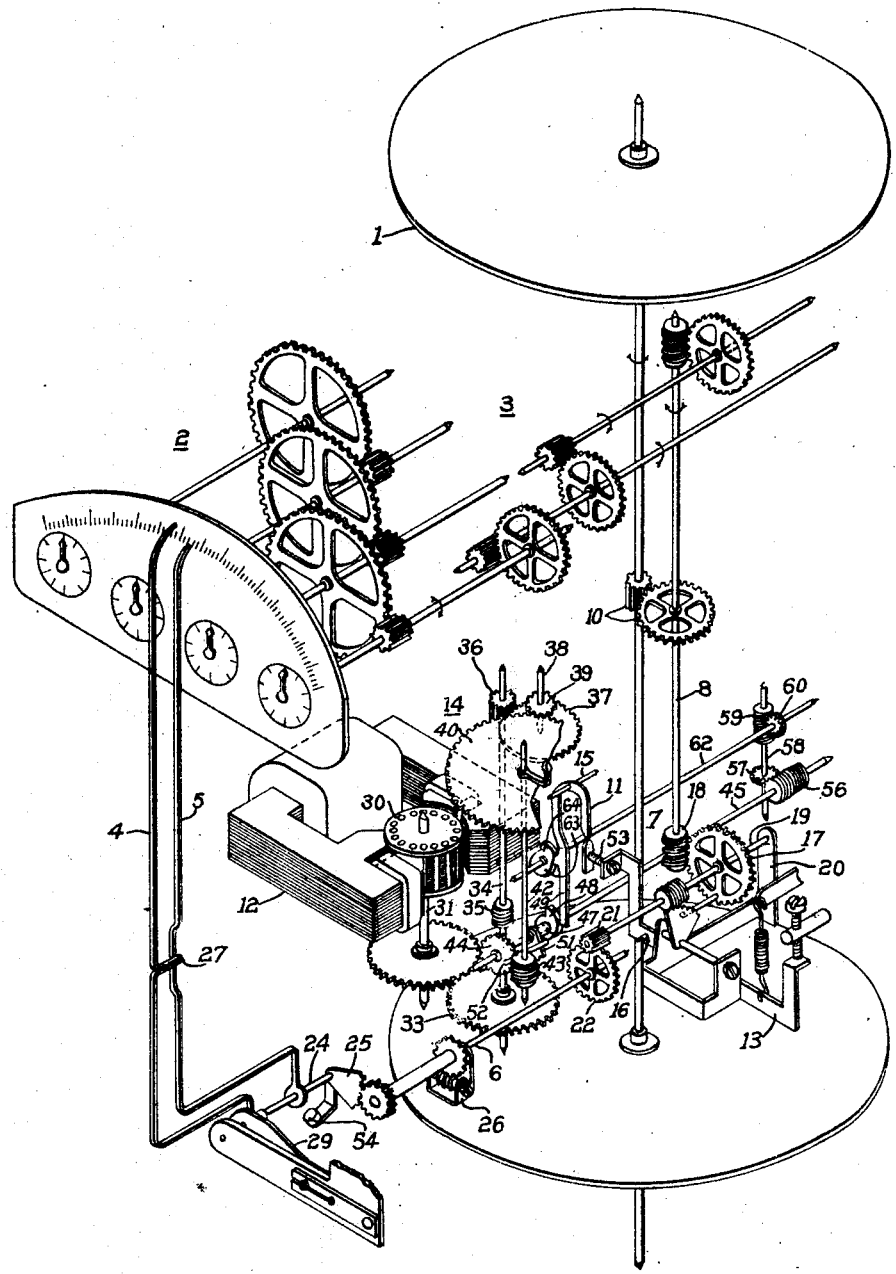
WITNESSES:
A. G. Schiefelbein.
F. H. Miller
INVENTOR
James E. Bridges.
BY
Wesley S. Barr
ATTORNEY Patented June 1, 1926.

1,586,649

UNITED STATES PATENT OFFICE.

JAMES E. BRIDGES, OF ALAMEDA, CALIFORNIA.

ELECTRICAL MEASURING INSTRUMENT.

Application filed May 15, 1924. Serial No. 713,436.

My invention relates to electrical measuring instruments and particularly to off-peak demand meters of the indicating type.

One object of my invention is to provide a device of the above indicated character that shall indicate the periodic demand of the energy consumed in a circuit, under certain operating conditions, and that shall be automatically rendered inoperative to give no indication of the demand during other operating conditions.

Another object of my invention is to provide an off-peak demand meter that shall be simple and durable in construction and effective in its operation.

Heretofore, it has been suggested, in measuring electrical energy, to provide meters that operate at different speeds at different periods, during which the charge for the energy consumed is based on different rates. It has also been suggested to control the rate of operation of a meter from a central station by the use of a pilot wire which involved the use of magnets and other complicated and expensive structures.

In order to more equitably distribute the charges for electrical energy, it has been suggested to take the periodic energy demand into consideration only during such hours that the power station is working at or near its full capacity, such as between 6 a. m. and 11 p. m., and to discontinue the indications of the demand from 11 p. m. to 6 a. m. This suggestion is to encourage the use of energy during the ordinarily low-load periods, so as to more uniformly distribute the station load and to permit more efficient operation of the power station.

In practicing my invention, I provide a periodic-demand meter that operates to indicate the demand during successive intervals of time during the heavy-demand portion of the day and that is automatically rendered inoperative to indicate the demand during the low-load period.

To assist in the understanding of my invention, reference may be had to a copending application, Serial No. 439,327, maximum-demand meters, filed Jan. 24, 1921, by Walter G. Mylius and assigned to the Westinghouse Electric & Manufacturing Company, in which is shown an instrument for co-operation with which my invention is particularly adapted. This instrument comprises, in general, a rotating meter element, a demand-indicating pointer, separable gear members for connecting the pointer to the meter element and for momentarily disconnecting the pointer from the element to reset the pointer, a synchronous motor, a relatively high-speed member driven by the motor for quickly separating the gear members and a time-operated member driven by the motor for controlling the actuation of the high-speed member.

The single figure of the accompanying drawing, is a distorted perspective view of a portion of an off-peak maximum-demand meter embodying my invention.

In general, an instrument embodying my invention comprises an actuating meter element 1, an integrating mechanism 2 that is connected to the element 1 through a suitable gear mechanism 3 for indicating the total energy consumption of a circuit, a pointer or indicating member 4 for indicating the integrated maximum power demand of the circuit and a resetting pointer 5 that is connected to the meter element 1 through a shaft 6, gear mechanism 7, a shaft 8 and gears 10. Co-operating lever members 11 and 13 are provided for disengaging the gear mechanism 7 from the gear mechanism 10 to disconnect the element 1 from the pointer 5. A synchronous electric-motor device 12 for actuating a timing mechanism 14, controls the movement of the lever 11.

For a more complete understanding of the operation of the synchronous motor 12, reference may be had to co-pending application, Serial No. 557,294, filed April 29, 1922, by O. F. Rowe, and assigned to the Westinghouse Electric & Mfg. Company. This motor comprises, in general, a field-magnet structure embodying a core member having split-pole ends and closed-circuited loops disposed around certain of said ends to render the speed of rotation of its armature subsynchronous. The armature comprises magnetic and non-magnetic portions of such construction and relation to each other and to the field-magnet structure as to provide the motor with the relatively strong starting characteristics of an induction motor for more effectively initiating its rotation and quickly getting it into step with the field.

The lever 11 is mounted on a pivot pin or shaft 15 that is mounted in suitable bearings (not shown). The lever 13 is similarly pivotally mounted on a pin 16 and carries a gear wheel 17 for engagement with a worm screw 18 on the shaft 8. The gear wheel 17 is mounted on a shaft 19 that is carried in a bearing arm 20 of the lever 13. The shaft 19 also carries a pinion 21 for engagement with a gear wheel 22 on the shaft 6.

The pointer 5 is rigidly connected to the shaft 6 through a shaft 24, gear members 25 and a zero-adjusting device 26. The pointer 4 is relatively movably mounted on the shaft 24 and frictionally held in position by an adjustable spring device 29.

The rotor 30 of the synchronous motor 12 is connected, through its shaft 31 and gear members 33 to a shaft 34. The latter carries a worm screw 35 at an intermediate portion, and a pinion 36 adjacent to one end thereof.

The pinion 36 engages a gear wheel 37 on a shaft 38 that also carries a pinion 39 for engagement with a gear wheel 40 on a shaft 42. The latter carries a worm screw 43 for engagement with a worm wheel 44 that is carried on a shaft 45. The ratios of the worm screws, pinions and gear wheels just described are such that, while the worm screw 35 rotates at a high speed relative to the speed of the rotor 30, the shaft 45 rotates once in a predetermined time interval, such as fifteen minutes.

A sleeve 47, relatively movably mounted on the shaft 45, carries a cam having a portion 48 for engagement with one arm 49 of the lever 11 to move the latter about its pivot pin 15 with each revolution of the shaft 45. The sleeve 47 also carries a segmental gear 51 that is adapted to be moved by a pin 52, projecting laterally from the gear wheel 44, into engagement with the worm screw 35 once in every revolution of the shaft 45.

Thus, the segmental gear member 51 when brought into engagement with the worm screw 35, will be turned quickly by the latter to cause the cam projection 48 to quickly turn the lever member 11 about its pin 15. Movement of the lever 11 is transmitted to the lever 13, through an adjusting screw 53, to turn the lever 13 about its pivot pin 16 to thereby disengage the gear wheel 17 from the worm screw 18. When the gear wheel 17 is thus disengaged from the worm screw 18, a weight member 54, on the shaft 24, causes the pointer 5 to return quickly to its initial zero position, after which, since the segmental gear 51 has become disengaged from the worm screw 35, and the cam projection 48 has passed beyond the end of the arm 49 of the lever 11, the lever 13 will return to the position indicated in the drawings in which the gear wheel 17 is in engagement with the worm screw 18. This action causes the pointer 5 to begin a new demand indication.

A worm screw 56, mounted on the shaft 45, engages a worm wheel 57 that is mounted on a shaft 58 which also carries a worm screw 59. The worm screw 59 engages a worm wheel 60 that is mounted on a shaft 62 which also carries a cam 63. The ratios of the worm screws 56 and 59 to the worm wheels 57 and 60, respectively, are such that the shaft 62 rotates once in each 24-hour period.

The cam 63 is provided with a raised portion 64 which is adapted to engage a projection on the arm 49 on the lever 11 to turn the lever about its pivot pin 15, similarly to the action of the cam projection 48, but, in contradistinction to the momentary movement of the lever 11 imparted thereto by the cam portion 48, the raised portion 64 of the cam 63 holds the lever 11 in its turned position for a predetermined period of time, such as seven hours. This operation, in turn, disengages the gear wheel 17 from the worm screw 18 to reset the pointer 5 to its initial or zero position, where it will remain for the seven-hour period.

Since the motor 12 is adapted for operation in an alternating-current circuit, which is regulated for frequency, the cam 63 may be caused to turn in definite relation to each diurnal period. Thus, the pointer 5 will be reset to its zero position at a predetermined time, such as at 11 p. m., and be caused to remain inoperative until 6 a. m. or any other arbitrary time ending a period of relatively low demand from the power station.

The cam 63 may be adjusted to actuate the lever 11 at any desired instant but is preferably caused to actuate the lever simultaneously with the operation of the lever by the cam portion 48. This action permits the pointer 5 to be reset at the end of each of similar successive relatively short periods, such as the fifteen-minute periods above mentioned, and to be rendered inoperative for the longer period mentioned, beginning at the end of one of the shorter periods.

While I have shown and described a particular form of my invention, changes may be effected therein without departing from the spirit and scope thereof, as set forth in the appended claims.

I claim as my invention:—

1. The combination with a meter element, an indicating member actuated thereby and resetting means including a driving member, an operating member for disconnecting said indicating member from said element, a member driven by said driving member for actuating said operating member, and means including a member driven by said driving member to cause said first driven member to actuate said operating member at the ends of predetermined regular time periods, of means comprising a member driven by the driving member for periodically disconnecting said indicating member from the meter element for predetermined time intervals.

2. The combination with a meter element, an indicating member actuated thereby and resetting means including a driving member, an operating member for disconnecting said indicating member from said element, a member driven by said driving member for actuating said operating member, and means including a member driven by said driving member to cause said first driven member to actuate said operating member at the ends of predetermined regular time periods, of means comprising a member driven by the driving member for actuating said operating member to periodically disconnect said indicating member from the meter element for predetermined time intervals.

3. The combination with a meter element, an indicating member actuated thereby and resetting means including a relatively high-speed driving member, an operating member for disconnecting said indicating member from said element, a member driven by said driving member at a relatively high speed for actuating said operating member, and means including a member driven by said driving member at a relatively low speed to cause said first driven member to actuate said operating member at the ends of predetermined time periods, of means comprising a member driven by the driving member for periodically disconnecting said indicating member from the meter element for predetermined time intervals.

4. In a meter, the combination with a movable meter element, a demand-indicating member actuated thereby and a resetting mechanism comprising a motor, an operating member for disconnecting said member from said element, a member driven by said motor for actuating said operating member, and means including a member driven by said motor to cause said first motor-driven member to actuate said operating member at the ends of predetermined regular time periods, of means comprising a member driven by the motor for actuating said operating member to periodically disconnect said demand-indicating member from the meter element for predetermined time intervals.

5. In a meter, the combination with a meter element, a demand-indicating member actuated thereby and a resetting mechanism comprising a high-speed synchronous motor, an operating member for disconnecting said member from said element, a high-speed member driven by said motor for actuating said operating member, and means including a member driven by said motor to cause said high-speed member to actuate said operating member at the ends of predetermined regular time periods, of means comprising a member driven by the motor for actuating said operating member to periodically disconnect said demand-indicating member from the meter element for predetermined time intervals.

In testimony whereof, I have hereunto subscribed my name this 15th day of April 1924.

JAMES E. BRIDGES.